US009906472B2

(12) United States Patent
Costenaro et al.

(10) Patent No.: US 9,906,472 B2
(45) Date of Patent: *Feb. 27, 2018

(54) DYNAMIC NAVIGATION BAR FOR EXPANDED COMMUNICATION SERVICE

(71) Applicant: Microsoft Corporation, Redmond, WA (US)

(72) Inventors: Daniel Costenaro, Bellevue, WA (US); Elizabeth Holz, Seattle, WA (US); Alessio Roic, Seattle, WA (US); Jedidiah Brown, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 653 days.

This patent is subject to a terminal disclaimer.

(21) Appl. No.: 14/500,923

(22) Filed: Sep. 29, 2014

(65) Prior Publication Data
US 2015/0019988 A1 Jan. 15, 2015

Related U.S. Application Data

(63) Continuation of application No. 13/314,515, filed on Dec. 8, 2011, now Pat. No. 8,875,051.

(51) Int. Cl.
G06F 3/048 (2013.01)
H04L 12/58 (2006.01)
(Continued)

(52) U.S. Cl.
CPC ......... H04L 51/046 (2013.01); G06F 3/0482 (2013.01); G06F 3/0484 (2013.01); G06Q 10/10 (2013.01)

(58) Field of Classification Search
CPC .................................................. G06F 3/04842
See application file for complete search history.

(56) References Cited

U.S. PATENT DOCUMENTS 7,349,920 B1 * 3/2008 Feinberg .............. G06Q 10/109
2003/0158855 A1 * 8/2003 Farnham ............... G06F 3/0481
(Continued)

FOREIGN PATENT DOCUMENTS

CN 101273327 A 9/2008
CN 102239491 A 11/2011
(Continued)

OTHER PUBLICATIONS

"Second Office Action and Search Report Issued in Chinese Patent Application No. 201210525772.8", dated Jun. 30, 2015, 15 Pages.
(Continued)

Primary Examiner — William Bashore
Assistant Examiner — Rayeez Chowdhury
(74) Attorney, Agent, or Firm — Turk IP Law, LLC

(57) ABSTRACT

A navigation bar is provided for switching between modules within an expanded communication service such as email, calendar, contacts, tasks, etc. and for presenting preview peeks associated with each module to a user. A temporary preview of a module may be provided upon a hover action over predefined navigation bar locations such as icons and/or textual identifiers without actually needing to switch to a module. The preview may also be docked or pinned to a location on the main user interface so that it is displayed within the main user interface. New or interesting activity within each module may be highlighted by displaying an information badge next to a module name, for example.

19 Claims, 12 Drawing Sheets

(51) Int. Cl.
G06F 3/0482 (2013.01)
G06Q 10/10 (2012.01)
G06F 3/0484 (2013.01)

(56) References Cited

U.S. PATENT DOCUMENTS

| | | | |
|---|---|---|---|
| 2003/0158917 A1* | 8/2003 | Andrew | H04L 67/04 709/220 |
| 2004/0205514 A1* | 10/2004 | Sommerer | G06F 17/212 715/205 |
| 2004/0205711 A1 | 10/2004 | Ishimitsu et al. | |
| 2005/0005249 A1 | 1/2005 | Hill et al. | |
| 2005/0091612 A1 | 4/2005 | Stabb et al. | |
| 2006/0271864 A1 | 11/2006 | Satterfield et al. | |
| 2007/0011258 A1* | 1/2007 | Khoo | G06F 3/0482 709/206 |
| 2007/0061307 A1* | 3/2007 | Hartwell | G06F 17/30637 |
| 2007/0061308 A1 | 3/2007 | Hartwell et al. | |
| 2008/0034047 A1* | 2/2008 | Rosenberg | G06Q 10/109 709/206 |
| 2008/0295017 A1 | 11/2008 | Tseng et al. | |
| 2008/0318197 A1 | 12/2008 | Dion | |
| 2009/0007012 A1* | 1/2009 | Mandic | G06F 3/0481 715/810 |
| 2009/0083062 A1 | 3/2009 | Gupta | |
| 2009/0260060 A1* | 10/2009 | Smith | H04L 63/105 726/3 |
| 2010/0070894 A1* | 3/2010 | Krishnamurthy | G06F 3/0481 715/764 |
| 2010/0107062 A1* | 4/2010 | Bacus | G06F 17/212 715/269 |
| 2010/0146012 A1 | 6/2010 | Beaudreau et al. | |
| 2010/0174993 A1 | 7/2010 | Pennington et al. | |
| 2010/0313165 A1* | 12/2010 | Louch | G06F 3/0481 715/792 |
| 2011/0099471 A1* | 4/2011 | Manijak | G06Q 10/06 715/274 |
| 2011/0145744 A1 | 6/2011 | Haynes et al. | |
| 2011/0145751 A1 | 6/2011 | Landman et al. | |
| 2011/0166777 A1 | 7/2011 | Chavakula | |
| 2011/0167369 A1 | 7/2011 | van Os | |

FOREIGN PATENT DOCUMENTS

| | | |
|---|---|---|
| JP | 2000163383 A | 6/2000 |
| JP | 2004318872 A | 11/2004 |
| TW | I224753 B | 12/2004 |
| TW | 200937230 A | 9/2009 |

OTHER PUBLICATIONS

"Supplementary Search Report Received for European Patent Application 12855307.0", dated Jul. 7, 2015, 8 Pages.

"Third Office Action Issued in Chinese Patent Application No. 201210525772.8", dated Jan. 13, 2016, 10 Pages.

"First Office Action and Search Report for Chinese Patent Application No. 201210525772.8", dated Nov. 15, 2014, 15 Pages.

"Office Action Issued in Japanese Patent Application No. 2014-545938", dated Aug. 1, 2016, 8 Pages.

Ootsuki, Takami, "Hitome De Wakaru Microsoft Outlook 2010", Kouji Segawa of Nikkei Business Publications, Inc., Jun. 21, 2010, 11 Pages.

"Notice of Allowance Issued in Japanese Patent Application No. 2014-545938", dated Feb. 28, 2017, 3 Pages. (W/O English Translation).

"Notice of Allowance Issued in Taiwan Patent Application No. 105126717", dated Feb. 24, 2017, 6 Pages.

International Search Report dated Mar. 4, 2013, Application No. PCT/US2012/066689, Filed Nov. 28, 2012, pp. 12.

"Windows 7 Help and Tips", Retrieved at ,,http://malektips.com/windows_7_help_and_tips.html>>, Retrieved Date: Nov. 22, 2011, pp. 5.

"Features new to Windows7", Retrieved at <<http://en.wikipedia.org/wiki/Features_new_to_Windows_7>>, Retrieved Nov. 23, 2011, pp. 23.

"Customize the Navigation Pane", Retrieved at <<http://office.microsoft.com/en-us/outlook-help/customize-the-navigation-pane-HA001232203.aspx>>, Retrieved Date: Nov. 23, 2011, pp. 6.

"Office Action and Search Report Issued in Taiwan Patent Application No. 101140371", dated Apr. 25, 2016, 13 Pages.

* cited by examiner

DYNAMIC NAVIGATION BAR FOR EXPANDED COMMUNICATION SERVICE

RELATED APPLICATIONS

This application is a continuation of U.S. patent application Ser. No. 13/314,515 filed on Dec. 8, 2011 by the same inventors, commonly assigned herewith.

BACKGROUND

With the proliferation of computing and networking technologies, capabilities and features of software applications have increased in breadth and depth. Locally installed applications providing a single tool are increasingly replaced by hosted services that combine multiple interrelated capabilities. Outlook® form Microsoft Corporation of Redmond, Wash. is an example of such a suite of tools. Available in locally installed or hosted service versions, this program enables users to interact via email or text messaging, schedule appointments and meetings, manage tasks and/or contacts, and perform comparable actions. The services provided by such a program are interrelated in many aspects. For example, email and text messaging (as well as meeting scheduling) services may be associated with contacts of a user, scheduled meetings may be forwarded to others via email, and so on.

A software program (or service) such as Outlook® provides a multitude of features and capabilities for each of the services it includes. These features and capabilities are compounded when the number of tools provided by the program increases. A result of this compounding is the increasing complexity of the user interface making navigation for the user more difficult. While menus and different user interfaces enable a user to navigate through individual aspects of the program, combined user interfaces leave room for improvement of user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a navigation bar for switching between modules within an expanded communication service such as email, calendar, contacts, tasks, etc. and for providing preview peeks associated with each module to a user. According to some embodiments, a temporary preview of a module may be provided upon a hover action over predefined navigation bar locations such as icons and/or textual identifiers without actually needing to switch to a module. The preview may also be docked or pinned to a location on the main user interface so that it is displayed within the main user interface. New or interesting activity within each module may be highlighted by displaying an information badge next to a module name, for example.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
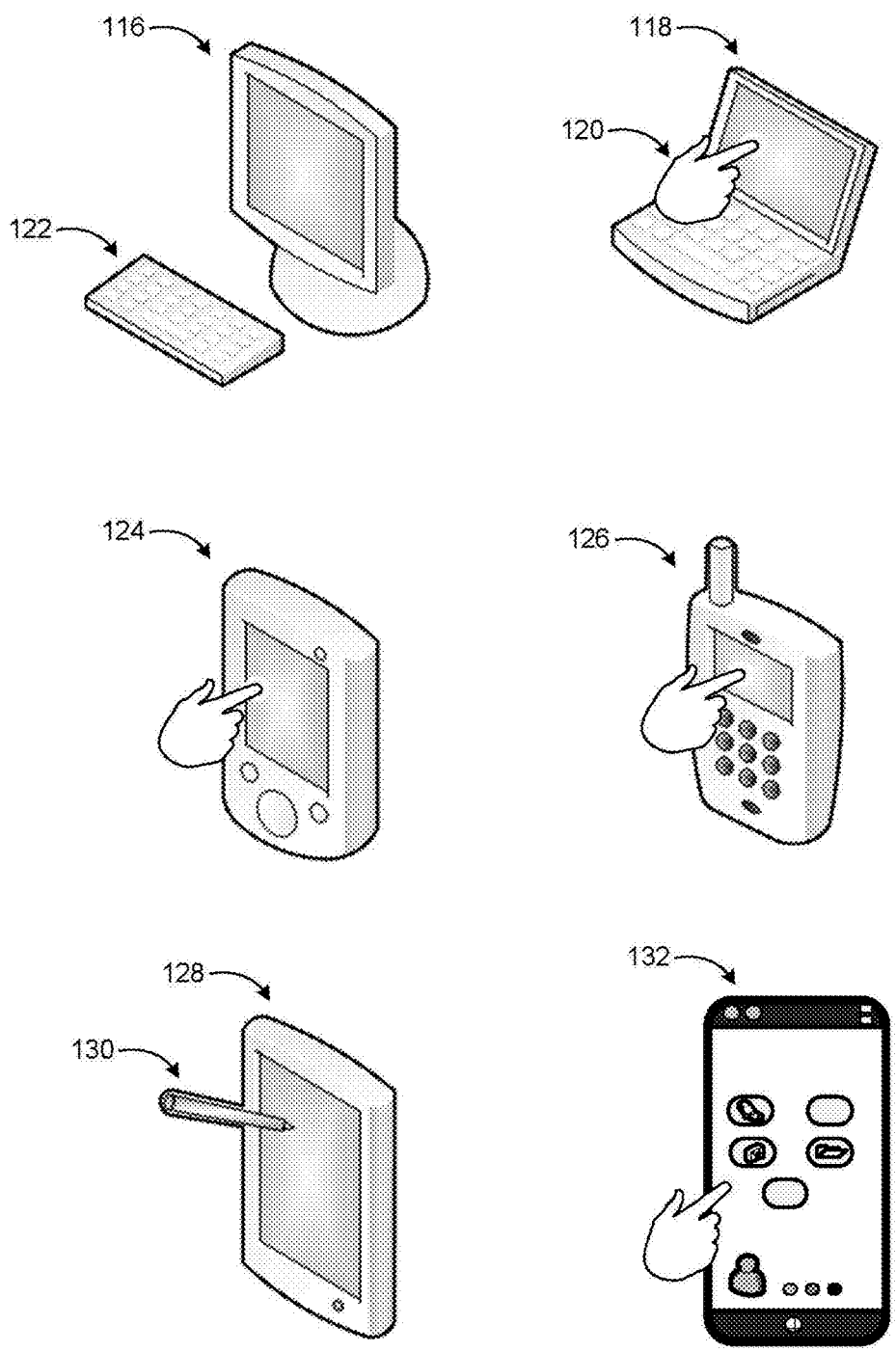
FIG. 1 illustrates some example devices, where a dynamic navigation bar for an expanded communication service may be employed.

As briefly described above, a dynamic navigation bar may be provided in conjunction with an expanded communication service for email, text messaging, scheduling, task management, contact management, and similar services. Enabling a user to switch between different modules of the service seamlessly while preserving valuable user interface space, the navigation bar may also provide temporary previews, summary information in form of information badges, and enable the previews to be docked for permanent viewing.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

An expanded communication service as used herein refers to a hosted service, an enterprise service, or a locally installed application that provides services such as email communications, text message exchange, calendar functionality, task management, contact management, and similar functionality. Such a service may include a number of integrate modules for individual services or some modules may provide multiple services. A main user interface may enable users to interact with the service receiving notifications, viewing different items, providing input for various functions, etc. As discussed below, a variety of devices may be used to execute such a service and different interactions mechanisms such as touch, gesture, voice, gyroscopic input through a finger, a pen, a mouse, or similar device, as well as through predefined keyboard entry combinations may be employed.

FIG. 1 illustrates some example devices, where a dynamic navigation bar for an expanded communication service may be employed. An expanded communication service according to embodiments may be provided in a server-client architecture, as a cloud-based service, or as a locally installed application as discussed above. Thus, a variety of devices may be used to present the user interface to users. In addition to different computing devices, consumer electronics (e.g., TV consoles), personal digital assistants (PDAs), mobile phones, digital media and music players, hand-held game consoles, calculators, and computer peripherals may also be used.

Portable devices, many of which employ touch or gesture based input, tend to have smaller screen size, which means less available space for user interfaces. For example, in a user interface that enables editing of a document (text and/or graphics), in addition to the presented portion of the document, a virtual keyboard may have to be displayed further limiting the available space ("real estate"). Thus, in such scenarios, providing a full user interface for a multi-faceted communication service may be impractical or confusing to users.

Referring to FIG. 1, some example devices are illustrated, where a dynamic navigation bar saving valuable screen real estate while enabling efficient display of information associated with different embodiments may be provided according to embodiments. Embodiments may be implemented in other devices as well, with varying form factors and capabilities.

FIG. 1 includes several example devices such as computer monitor 116, touch enabled (120) laptop computer 118, handheld computer 124, smart phone 126, tablet computer (or slate) 128, and mobile computing device 132, which may be used for computing, communication, control, measurement, and a number of other purposes. Some of the example devices in FIG. 1 are shown with touch activation 120. However, any of these and other example devices may also employ gesture enabled activation. In addition, tools such as pen 130 may be used to provide touch input. A dynamic navigation bar and associated previews may be controlled also through conventional methods such as a mouse input or input through a keyboard 122.

Figure 2:
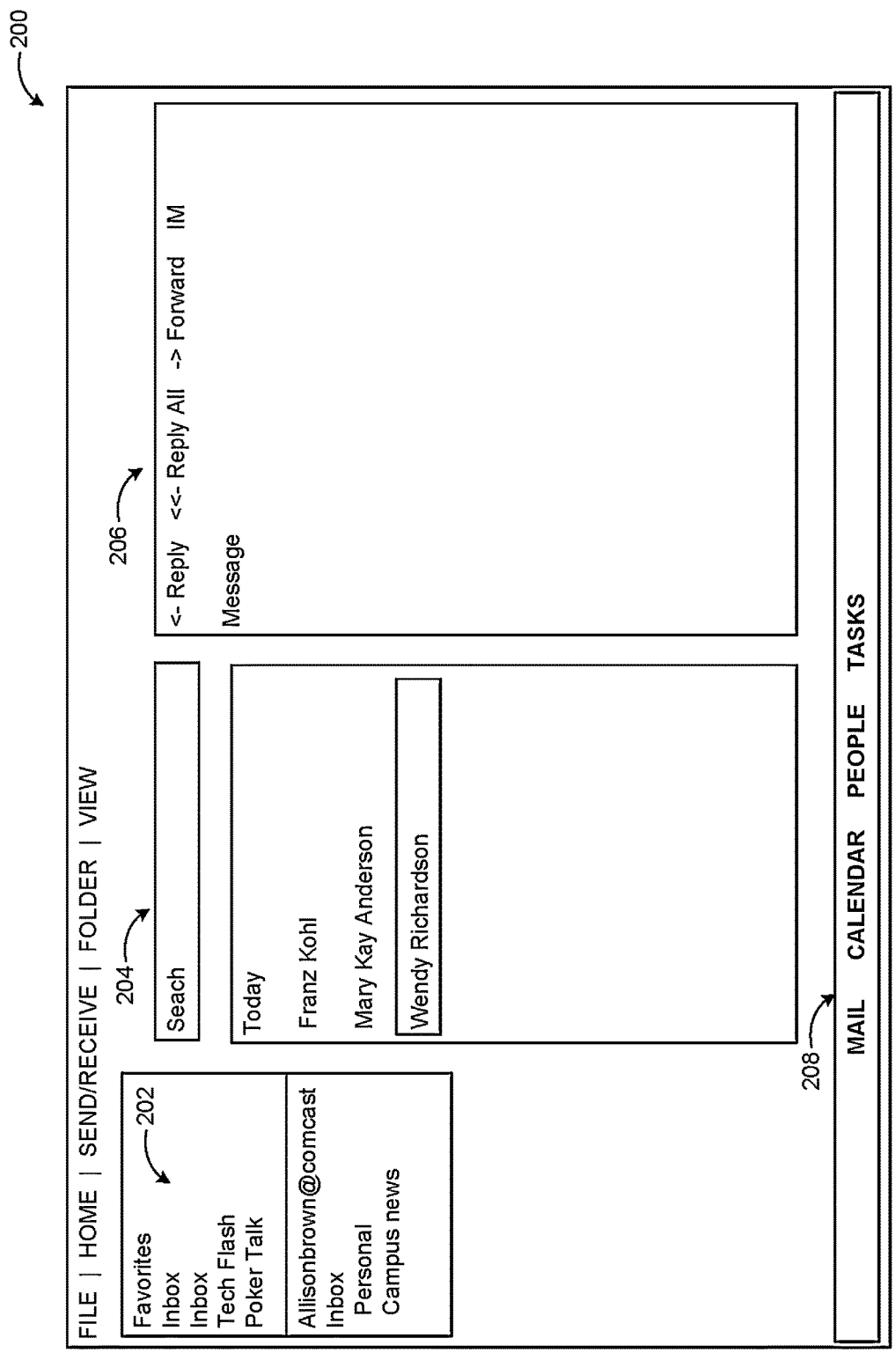
FIG. 2 illustrates a screenshot of a main user interface for an example expanded communication service with a dynamic navigation bar according to embodiments.

FIG. 2 illustrates a screenshot of a main user interface for an example expanded communication service with a dynamic navigation bar according to embodiments. The example user interface in screenshot 200 display information associated with an email module of an expanded communication service. The information includes a listing of folders 202 and a listing of emails 204 in a selected folder. A third viewing pane on the user interface displays a selected email 206.

In addition to email, the expanded communication service may provide text messaging, scheduling, task management, contact management, and similar functionality. In conventional user interfaces, a user may be enabled to switch between modules providing different functionalities by selecting a menu item or comparable control element. However, switching between modules also results in an interruption of user experience. When the user changes views from email to calendar for example, the information associated with email is no longer available, and vice versa. Thus, the user does not have the ability to check on another module while continuing to view one module without interruption. Some applications may enable a user to view multiple modules on the same user interface, but due to display area limitations, either the displayed views may be limited or the user interface may include too much information and become confusing to navigate for the user.

According to some embodiments, a textual, graphic, or combination navigation bar 208 may be provided on the user interface enabling the user to switch between different modules and view a preview of another module without leaving the current view of the user interface. To preserve valuable display area, the navigation bar 208 may be dynamically placed on a location on the user interface without taking up space from other displayed items such as the bottom (as shown in the figure), either side, top, or comparable location.

Keyboard, mouse, touch, gesture, pen input, voice commands are some example input mechanisms that may be used in conjunction with the navigation bar (and user interface). Other example input mechanisms may include, but are not limited to, accelerometer or orientation sensor based input, optically captured gestures, time-based input, proximity to other devices/people/places, and the like. In some embodiments, the navigation bar may also be presented and/or moved along a left side, a right side, a top, or a bottom of the user interface based on one or more of a left or right handedness of a user, a size of fingers (in touch-based devices), a size of tap action pointer associated with a pointing device, a user credential, an ergonomic characteristic of the computing device, and a location attribute comprising one or more of a language selection for the user interface, geographic location information, time zone information, and/or country information. If the size of the user interface changes (e.g., a change in display or opening of another user interface on the screen, etc.), then the navigation bar 208 may be moved and/or resized.

In some embodiments, a layout of the items displayed on the navigation bar 208 may be arranged and rearranged automatically based on above listed or other factors. A number of schemes may be employed to enhance the effectiveness of the navigation bar 208 such as a color scheme, a graphical scheme, a shading scheme, and comparable ones. For example, the items may be displayed in dark and/or light formats, which may be used interchangeably depending on a background color.

Figure 3:
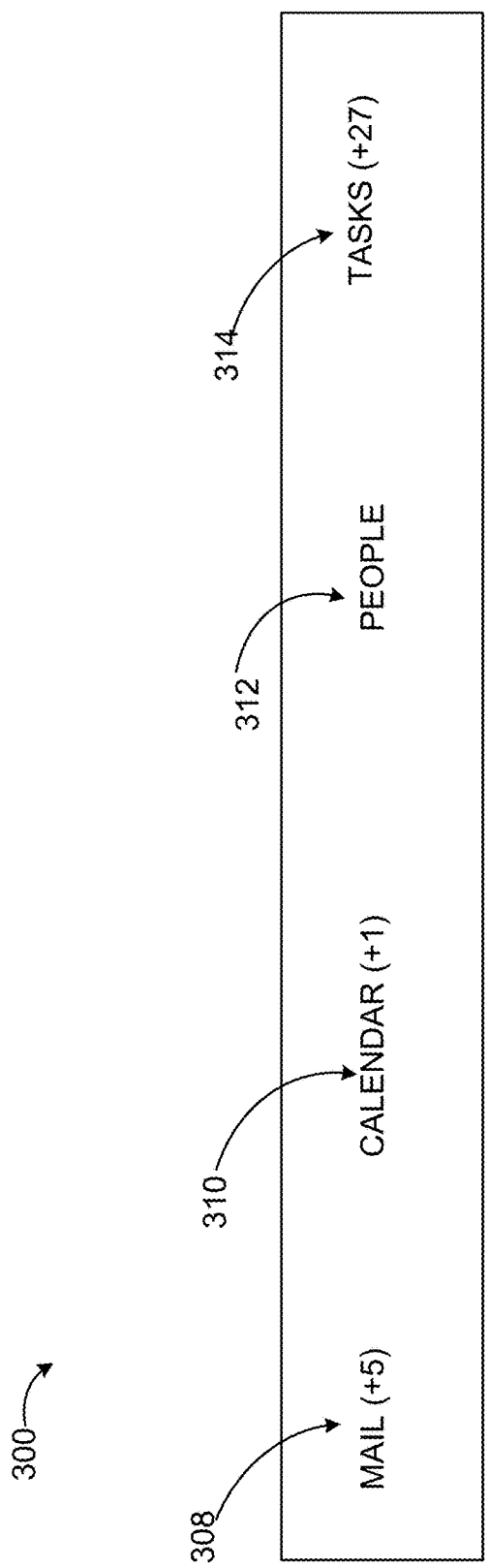
FIG. 3 illustrates an example dynamic navigation bar according to embodiments with information badges adjacent to module identifiers.

FIG. 3 illustrates an example dynamic navigation bar according to embodiments with information badges adjacent to module identifiers. Screenshot 300 shows a partial view of the user interface of FIG. 2 focusing on the navigation bar 308. The example navigation bar 308 includes textual items representing different modules such as email, scheduling, contacts, and tasks. In addition to providing access to the different modules, navigation bar 308 may also display summary information on new or interesting items in each of the modules through information badges. For example, information badge 310 may indicate five new emails, information badge 312 may indicate one new calendar item (appointment or meeting), and information badge 314 may indicate 27 current tasks.

In some embodiments, the notification badges 310, 312, and 314 may be automatically generated and/or configurable by the user. For example, the user may select which type of item (new, most recently viewed, an item of particular type, an item associated with a particular person, etc.) they want to be notified about.

In other embodiments, the navigation bar 308 may be extensible. Thus, items may be added to the navigation bar as new modules are added to the communication service by the service provider or by third parties. Furthermore, size and content of the navigation bar may be dynamically adjustable, fixed, or user configurable. For example, fewer or more items may be displayed depending on available display area. Similarly, a size of the displayed items (e.g., textual identifiers) may be modified in response to changes in available display area, user interface size, etc. In further embodiments, a user may be enabled to customize individual items in the navigation bar. For example, the view activated by each item, a font/size/style of each item, etc. may be configurable by the user.

Figure 4:
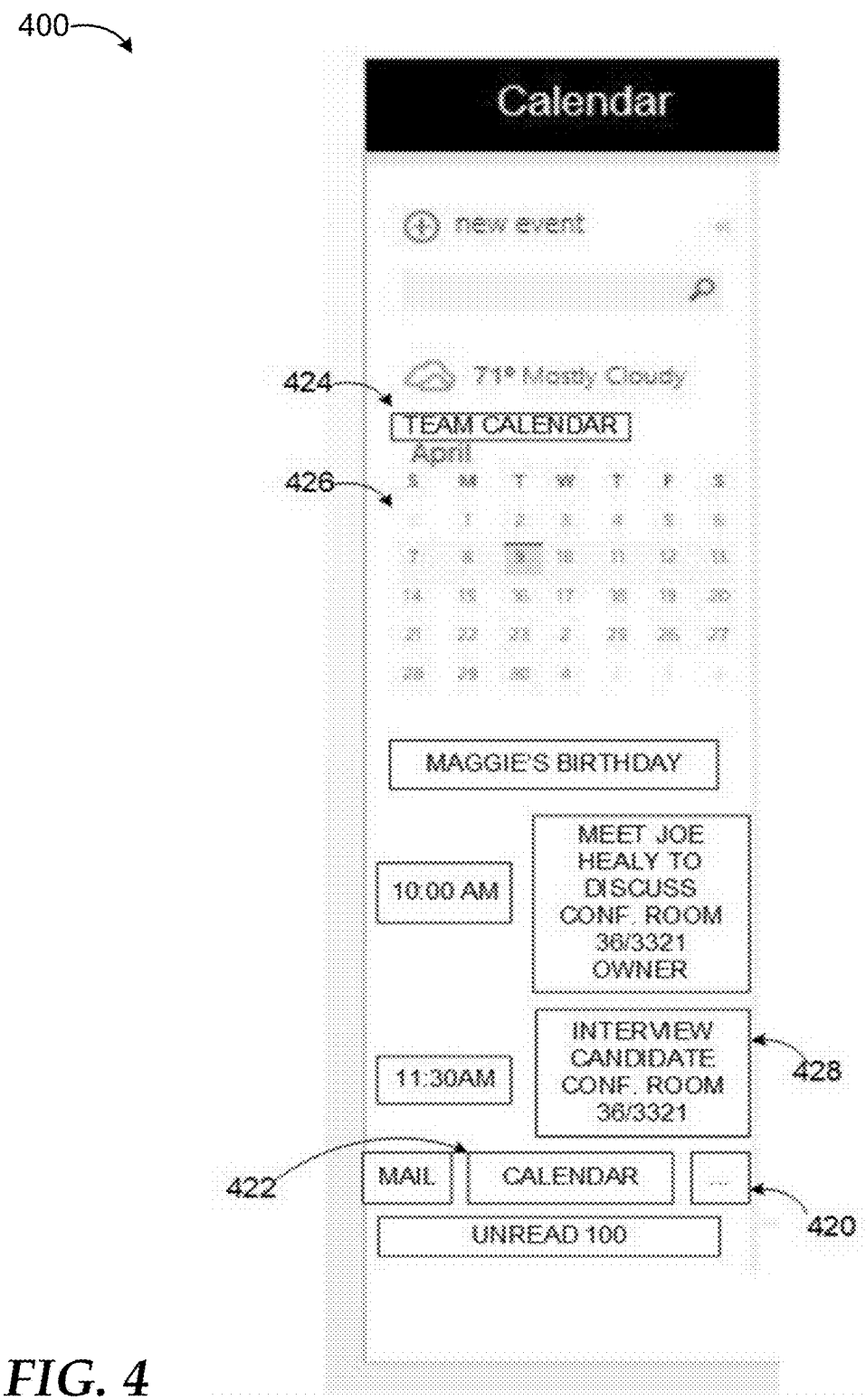
FIG. 4 illustrates the example main user interface of FIG. 2 with the navigation bar in a minimized state and a calendar preview being presented from the navigation bar.

FIG. 4 illustrates the example main user interface of FIG. 2 with the navigation bar in a minimized state and a calendar preview being presented from the navigation bar. As discussed previously, items on a navigation bar may be textual, graphic (e.g., icons), or a combination of both. Icon-based navigation bar may lend itself to be displayed in smaller size, thus saving display area.

The screenshot 400 in FIG. 4 displays the user interface in FIG. 2, where the text-based navigation bar at the bottom of the user interface is replaced with an icon-based, minimized state navigation bar 420. Minimized state navigation bar 420 may include icons only or combination of icons and text. In some embodiments, a textual tip may be displayed adjacent to an icon upon user selection (or hover action). Alternatively, some icons may include a textual tip while others do not (e.g., those commonly known).

Another aspect of a navigation bar according to embodiments is the preview feature. To enable a user to get a preview of a module without leaving currently displayed module, a preview pane 424 may be displayed temporarily in response to a hover action on one of the items of the navigation bar. In the screenshot 400, a calendar preview pane 424 is displayed in response to the user hovering over the calendar item 422 in minimized state navigation bar 420.

The calendar preview pane may include a summary view of the user's calendar 426 (e.g., month, week, day, etc.) and a summary 428 listing of some of the items (e.g., appointments) on the calendar.

The preview pane 424 may enable limited interaction for the user. For example, the user may be enabled to select one of the displayed summary items and view more details on that item. The information displayed on a preview pane may be automatically determined based on default parameters, learned from user behavior, manually configurable by the user, or obtained from other applications associated with the user. Moreover, the display and removal of the preview pane may be in an animated fashion.

In some embodiments, a design of the preview pane may be selected such that consistency is provided across different devices/applications. For example, the preview pane for a desktop user interface may be same as or similar to the user interface for that module on a handheld device user interface (e.g., a smart phone), thereby providing the user with a consistent look and feel across devices.

Figure 5:
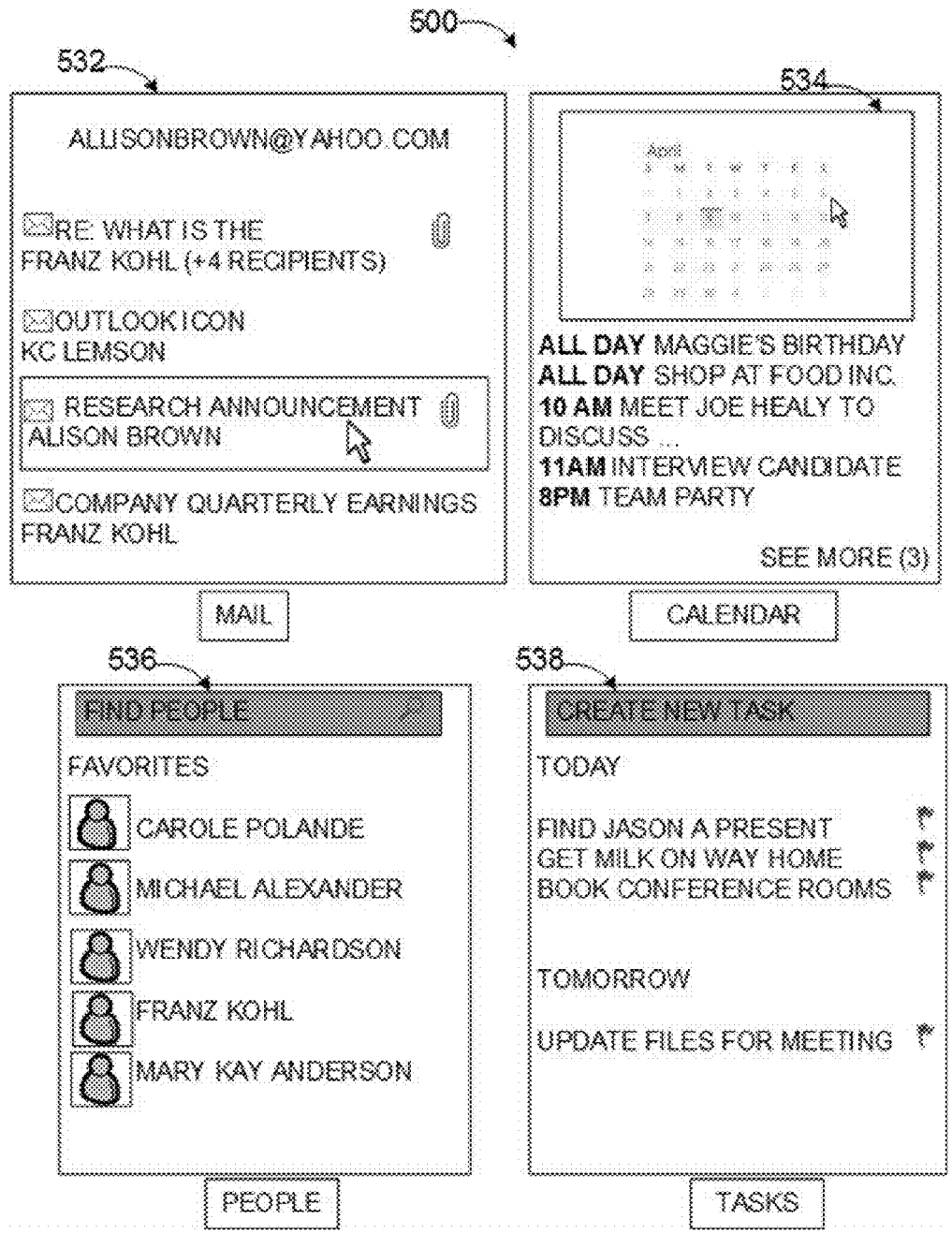
FIG. 5 illustrates example preview types of different modules associated with a navigation bar according to embodiments.

FIG. 5 illustrates example preview types of different modules associated with a navigation bar according to embodiments. The preview panes shown in diagram 500 are example preview panes for illustration purposes. As discussed previously, a navigation bar according to embodiments may be extensible and include items representing a number of default or added modules. Thus, preview panes associated with each of the items on the navigation bar may be provided. For example, productivity or customer relationship management (CRM) functionality modules may be added to an expanded communication service along with associated navigation bar items and preview panes.

Each preview pane may provide summary information related to the associated module with limited interaction for the user. For example, an email preview pane 532 may list a number of emails (e.g., top few, newest few, etc.) and enable the user to open, delete, mark the listed items. Which items are to be listed may be automatically determined and/or user configurable. Calendar preview pane 534 may display a summary calendar and some of the calendar items for the user. Similarly, a people preview pane 536 may display summary contact information for favorite contacts, most recent contacts, etc. A task list preview pane 538 may display a summary listing of some of the tasks chronologically or otherwise and enable the user to mark the tasks as completed, important, etc.

In some embodiments, the preview types may be active or inactive based on the context of the user interface. For example, if the user interface is displaying email module related information, displaying the preview for email may be unnecessary and that preview may be inactivated as long as email is the main displayed module. Along the same lines, the displayed items on the navigation bar may also be modified based on the context of the user interface. Thus, the email item on the navigation bar may be replaced with another item when email is the main displayed module on the user interface.

Figure 6A:
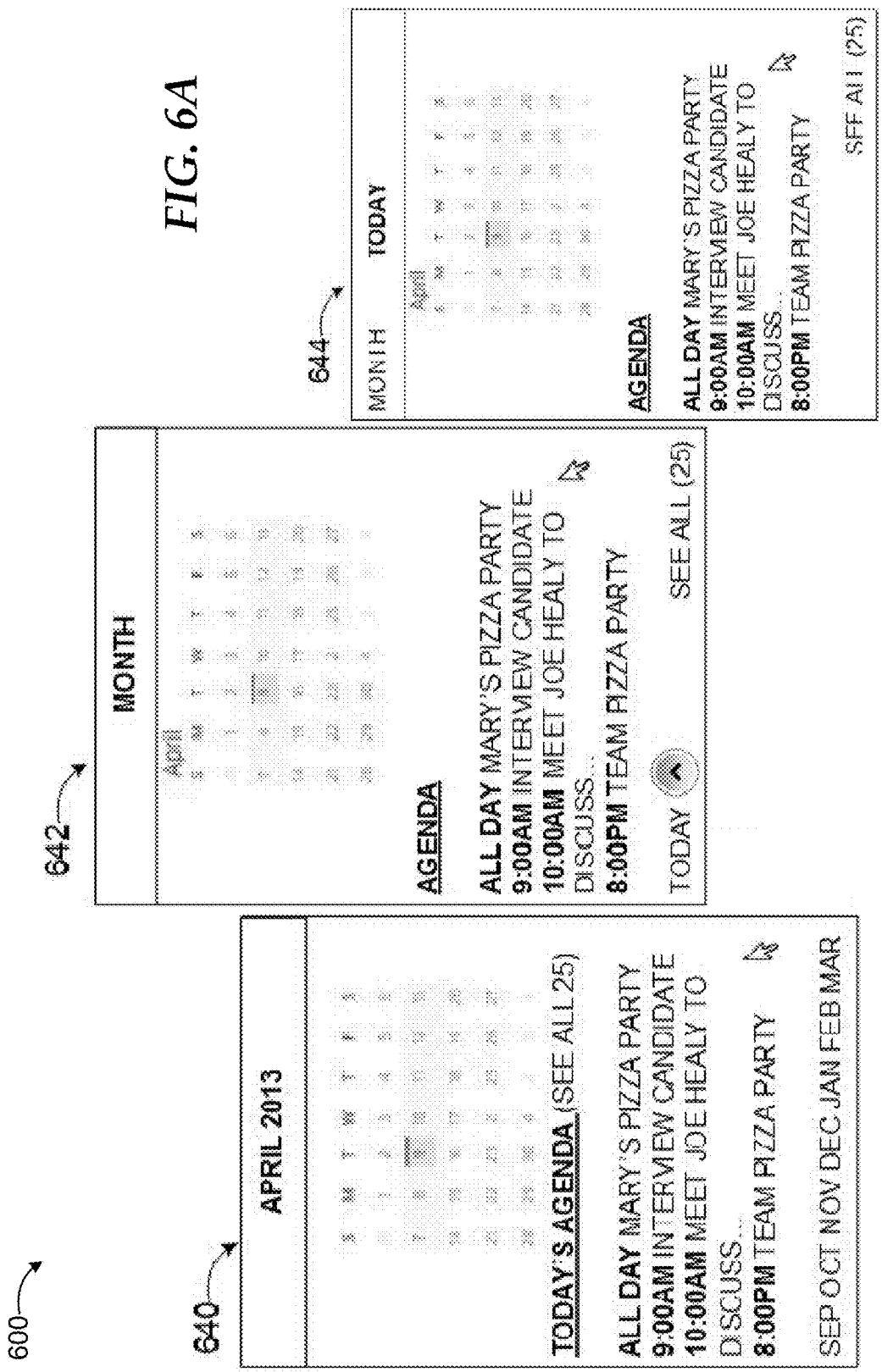
FIG. 6 illustrates example calendar preview types associated with a navigation bar according to embodiments.
Figure 6B:
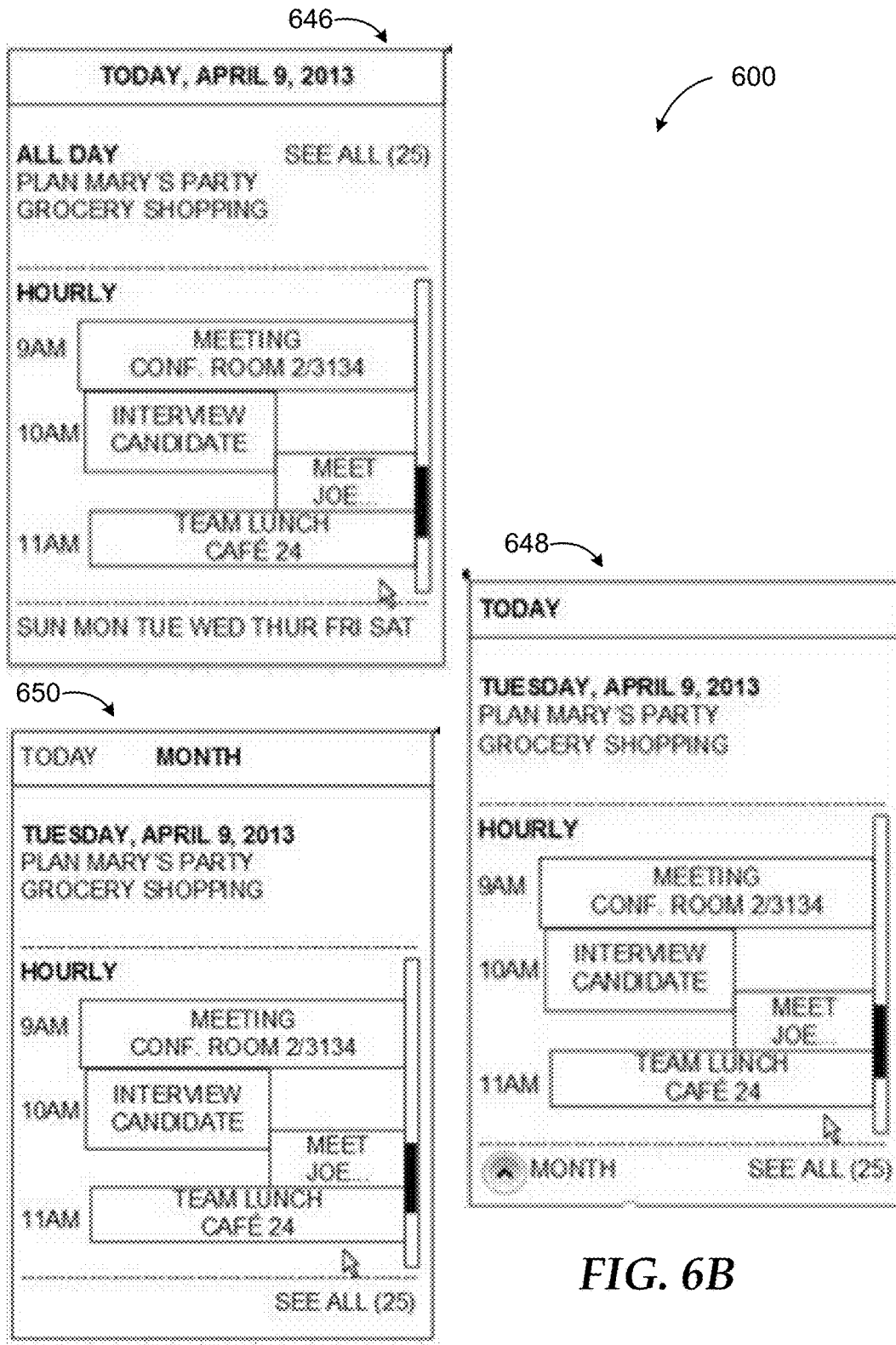

FIG. 6 illustrates example calendar preview types associated with a navigation bar according to embodiments. As described previously, the content of the preview panes may be determined automatically (e.g., through machine learning, usage history, retrieving information from other applications, etc.) and/or user configurable. The example preview panes in diagram 600 illustrate various examples of a calendar preview pane.

Preview pane 640 includes a monthly calendar and selected calendar items for the current day with the current month displayed in a title bar of the preview pane. A listing of available months (for selection) is displayed at the bottom. Preview pane 642 is similar to preview pane 640, but the fact that monthly calendar is displayed is emphasized in the title bar and the day selection (today) is displayed at the bottom of the preview pane. Preview pane 644 also displays the current month and selected items from the current day with the additional controls for switching the displayed month (arrows on the left and right of the displayed month).

Preview pane 646 displays a daily view with the days items (appointments, meetings, etc.) shown in graphic form (hourly). The current day is also displayed in the title bar with other days displayed at the bottom for user selection. Preview pane 648 displays a daily view in similar fashion with "Today" emphasized in the title bar and a control for switching the view to a monthly view provided at the bottom of the preview pane. In preview pane 650, the switching between daily and monthly views may be accomplished by selecting controls in the title bar. The above described preview pane configurations are examples only and do not constitute a limitation on embodiments. A preview pane associated with a dynamic navigation bar according to embodiments may be provided with any configuration and combination of textual, graphic, and other items using the principles described herein. Moreover, similar configurations and presentations may be used for other modules such as email, contact, tasks, etc.

Figure 7:
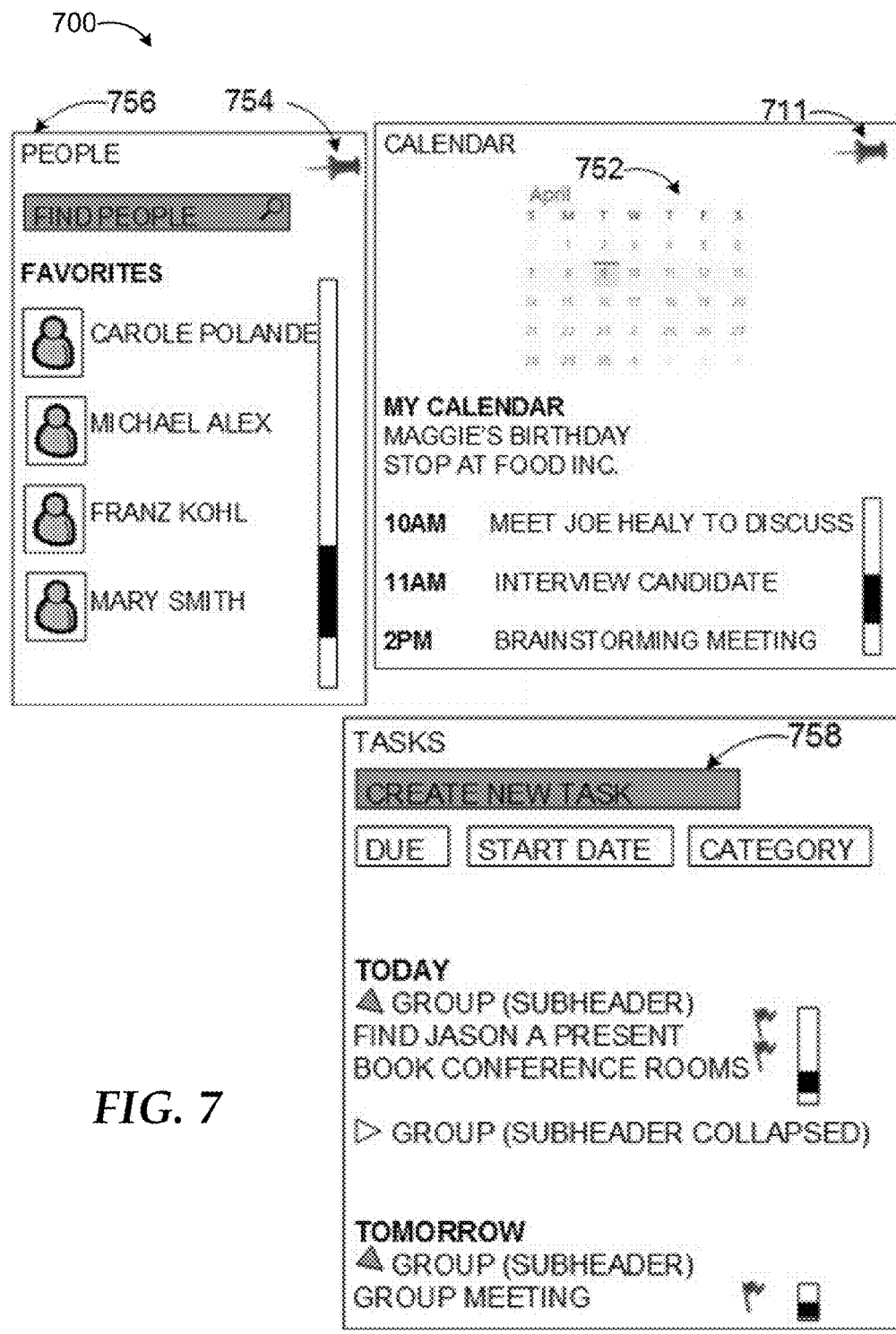
FIG. 7 illustrates three example previews docked together in association with a navigation bar according to embodiments.

FIG. 7 illustrates three example previews docked together in association with a navigation bar according to embodiments. Preview panes according to embodiments may be displayed temporarily in response to a hover action on the navigation menu. According to some embodiments, one or more preview panes may also be docked or pinned to a fixed location on the user interface for permanent display. Diagram 700 illustrates a combination of three preview panes docked together.

In the example of diagram 700, a calendar preview pane 752, a contacts preview pane 756, and a tasks preview pane 758 are docked together. A docking icon 654 indicates that the preview panes are currently docked and may be used to undock (or hide) the preview panes. The location for docking the preview panes may be user selectable or dynamically determined by the program based on displayed information on the user interface and available display area. Similarly, a size and content of the docked preview panes may also be selected and modified based on the display area and context of the user interface.

According to some embodiments, the preview panes may be docked and undocked according to an animation scheme. Moreover, a color scheme, a graphical scheme, and/or a shading scheme may be employed to enhance a visual effect of the preview panes in undocked or docked form.

Figure 8:
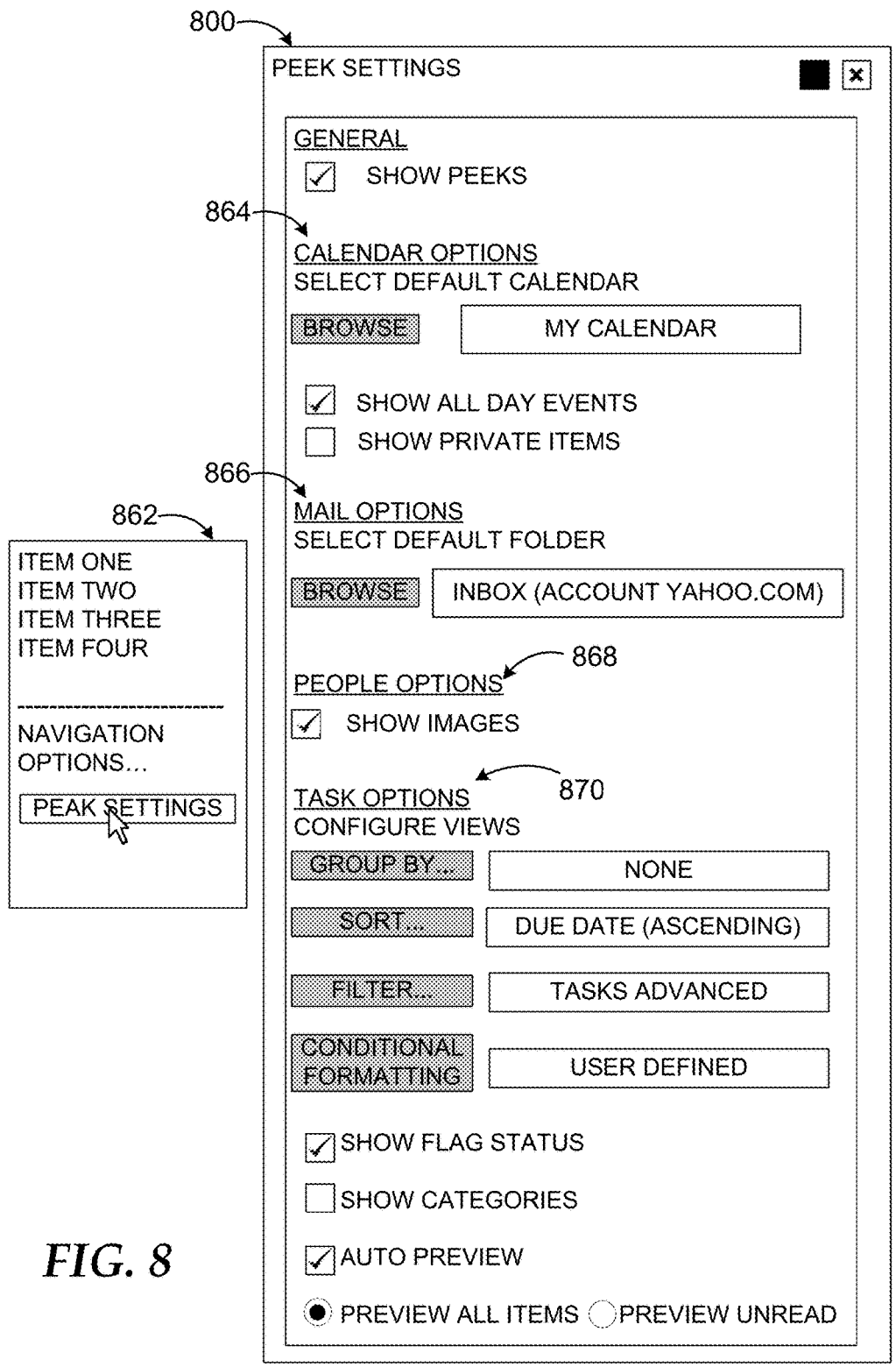
FIG. 8 illustrates a configuration menu for an example navigation bar according to embodiments.

FIG. 8 illustrates a configuration menu for an example navigation bar according to embodiments. While a navigation bar and associated preview panes may be automatically configured as discussed above, a configuration menu may also be provided for user customization.

According to some embodiments, a top level menu 862 may be provided for the user to select and customize the navigation bar itself, individual items on the navigation bar, and/or preview pane settings. The configuration menu 800 for customizing preview pane settings may include an option to activate or inactivate some or all of the preview panes. The configuration menu 800 may further include individual sections for different preview pane types such as calendar preview options 864, mail preview options 866, contacts preview options 868, and task preview options 870.

Configurable options for individual preview pane types may be determined based on application capabilities, context of the user interface, device capabilities, user credentials (e.g., permission levels), and so on. The configurable options may also be dynamically modified in response to application, computing device, display device, language or locale selection, or similar changes.

The example navigation bars, items, interactions, and configurations depicted in FIGS. 1 through 8 are provided for illustration purposes only. Embodiments are not limited to the shapes, forms, and content shown in the example diagrams, and may be implemented using other textual, graphical, and similar schemes employing the principles described herein.

Figure 9:
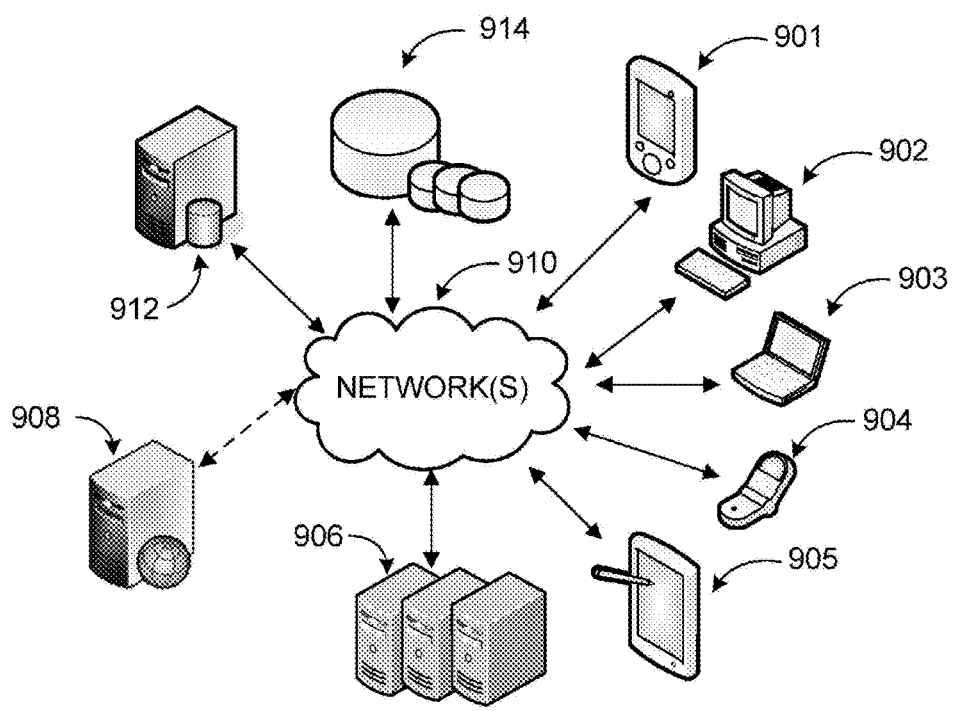
FIG. 9 is a networked environment, where a system according to embodiments may be implemented.

FIG. 9 is an example networked environment, where embodiments may be implemented. In addition to locally installed applications, such as communication application 1022 discussed below, navigation bars may also be employed in conjunction with hosted applications and services that may be implemented via software executed over one or more servers 906 or individual server 908. A hosted service or application may be a web-based service or application, a cloud based service or application, and similar ones, and communicate with client applications on individual computing devices such as a handheld computer 901, a desktop computer 902, a laptop computer 903, a smart phone 904, a tablet computer (or slate), 905 ('client devices') through network(s) 910 and control a user interface presented to users. One example of a web-based service may be Outlook® by Microsoft Corporation of Redmond, Wash., which provides email, text message, calendar, task management, and contact management services to clients through a browser interface on client devices. Such a service may enable users to interact with displayed content through a dynamic navigation bar and a variety of input mechanisms as discussed herein.

Client devices 901-905 are used to access the functionality provided by the hosted service or application. One or more of the servers 906 or server 908 may be used to provide a variety of services as discussed above. Relevant data may be stored in one or more data stores (e.g. data store 914), which may be managed by any one of the servers 906 or by database server 912.

Network(s) 910 may comprise any topology of servers, clients, Internet service providers, and communication media. A system according to embodiments may have a static or dynamic topology. Network(s) 910 may include a secure network such as an enterprise network, an unsecure network such as a wireless open network, or the Internet. Network(s) 910 may also coordinate communication over other networks such as PSTN or cellular networks. Network (s) 910 provides communication between the nodes described herein. By way of example, and not limitation, network(s) 910 may include wireless media such as acoustic, RF, infrared and other wireless media.

Many other configurations of computing devices, applications, data sources, and data distribution systems may be employed to provide a dynamic navigation bar in conjunction with an expanded communication service. Furthermore, the networked environments discussed in FIG. 9 are for illustration purposes only. Embodiments are not limited to the example applications, modules, or processes.

Figure 10:
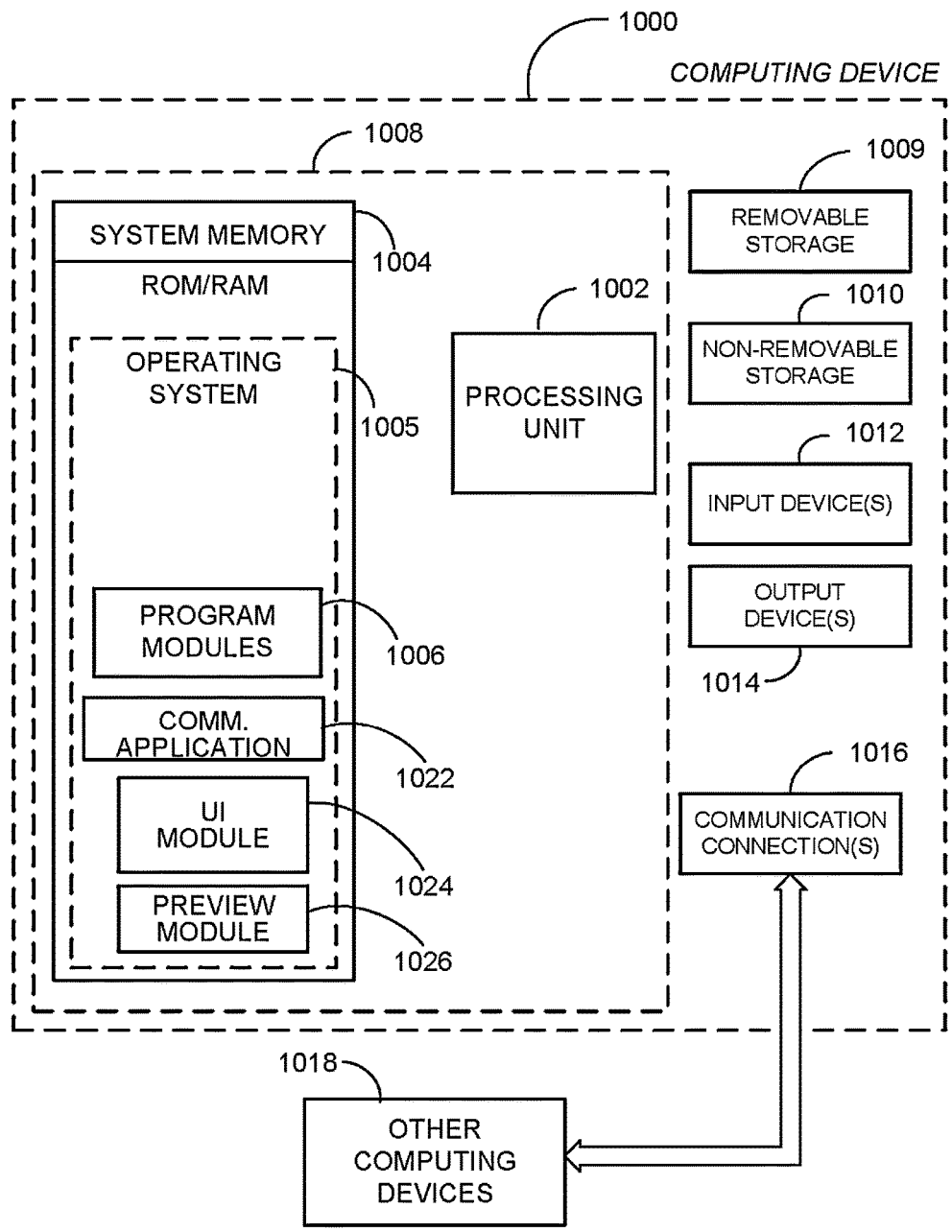
FIG. 10 is a block diagram of an example computing operating environment, where embodiments may be implemented.

FIG. 10 and the associated discussion are intended to provide a brief, general description of a suitable computing environment in which embodiments may be implemented.

With reference to FIG. 10, a block diagram of an example computing operating environment for an application according to embodiments is illustrated, such as computing device 1000. In a basic configuration, computing device 1000 may be any computing device in stationary, mobile, or other form such as the example devices discussed in conjunction with FIG. 1, and include at least one processing unit 1002 and system memory 1004. Computing device 1000 may also include a plurality of processing units that cooperate in executing programs. Depending on the exact configuration and type of computing device, the system memory 1004 may be volatile (such as RAM), non-volatile (such as ROM, flash memory, etc.) or some combination of the two. System memory 1004 typically includes an operating system 1005 suitable for controlling the operation of the platform, such as the WINDOWS®, WINDOWS MOBILE®, or WINDOWS PHONE® operating systems from MICROSOFT CORPORATION of Redmond, Wash. The system memory 1004 may also include one or more software applications such as program modules 1006, communication application 1022, user interface module 1024, and preview module 1026.

User interface module 1024 may operate in conjunction with the communication application 1022 and provide a user interface enabling a user to interact with different modules of the communication application such as email, text messaging, calendar, task list, and contacts. In addition to providing separate viewing panes for the modules, menus, and textual/graphical controls, user interface module 1024 may also provide a dynamic navigation bar enabling users to switch between viewing panes of different modules while preserving valuable display area. Furthermore, preview module 1026 may enable display of previews for each module highlighting interesting and new activity associated with each module. This basic configuration is illustrated in FIG. 10 by those components within dashed line 1008.

Computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1009 and non-removable storage 1010. Computer readable storage media may include volatile and nonvolatile, removable and non-removable media implemented in any method or technology for storage of information, such as computer readable instructions, data structures, program modules, or other data. System memory 1004, removable storage 1009 and non-removable storage 1010 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer readable storage media may be part of computing device 1000. Computing device 1000 may also have input device(s) 1012 such as keyboard, mouse, pen, voice input device, touch input device, an optical capture device for detecting gestures, and comparable input devices. Output device(s) 1014 such as a display, speakers, printer, and other types of output devices may also be included. These devices are well known in the art and need not be discussed at length here.

Computing device 1000 may also contain communication connections 1016 that allow the device to communicate with other devices 1018, such as over a wireless network in a distributed computing environment, a satellite link, a cellular link, and comparable mechanisms. Other devices 1018 may include computer device(s) that execute communication applications, other directory or policy servers, and comparable devices. Communication connection(s) 1016 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 11:
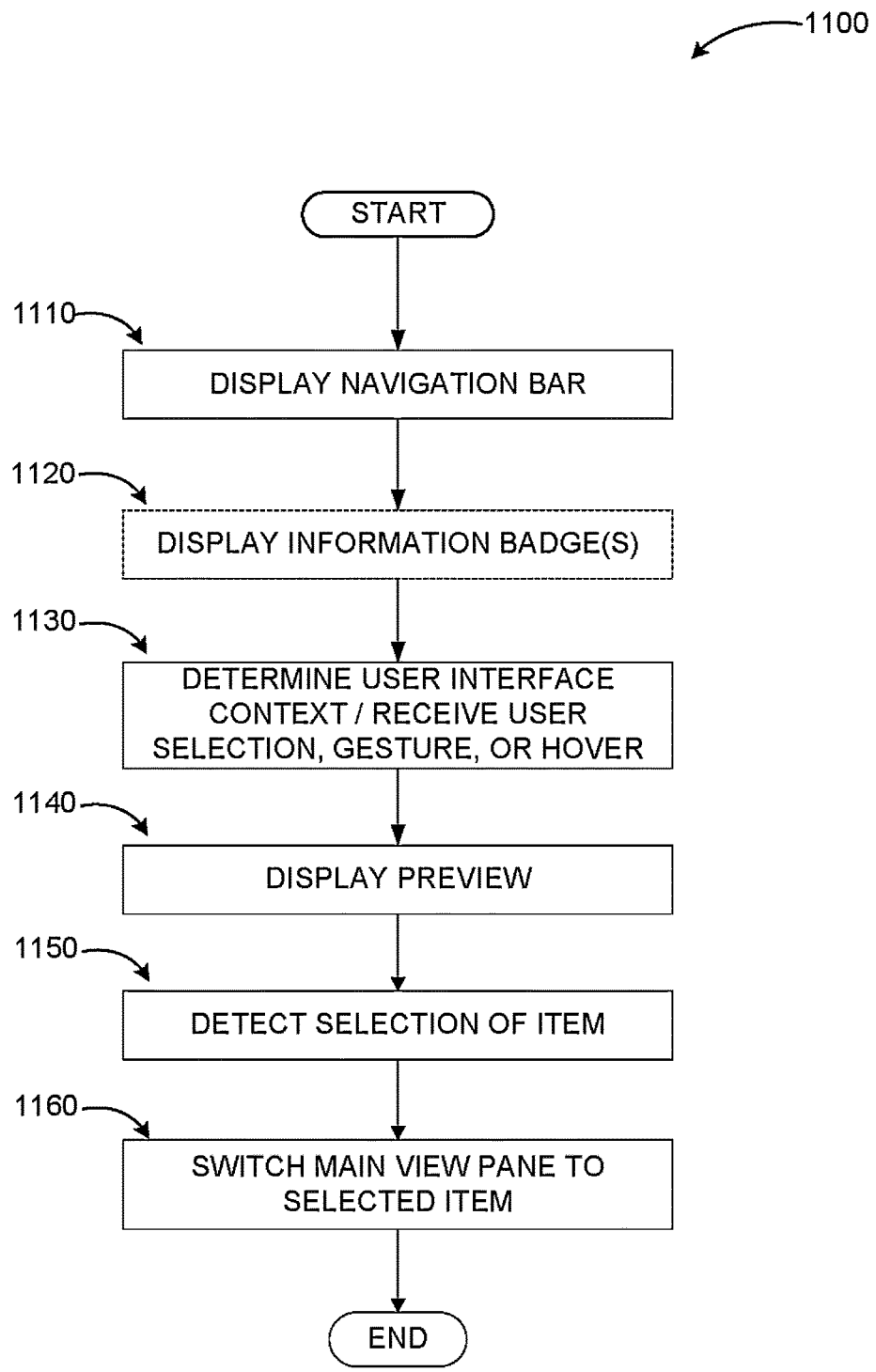
FIG. 11 illustrates a logic flow diagram for a process of providing a dynamic navigation bar according to embodiments.

FIG. 11 illustrates a logic flow diagram for a process of providing a dynamic navigation bar according to embodiments. Process 1100 may be implemented as part of an expanded communication service or application.

Process 1100 begins with operation 1110, where a dynamic navigation bar is displayed on a user interface of an expanded communication service or application. The navigation bar may include items presented in textual, graphic, or combination form. The navigation bar may be displayed at a suitable location on the user interface such that display area is efficiently utilized. At optional operation 1120, information badge(s) may be displayed next to the items on the navigation bar indicating available new or interesting items in each module represented by an item of the navigation bar.

At operation 1130, a user interface context may be determined and a user selection, a gesture, a hover, or similar action indicating user interest on one of the navigation bar items may be detected followed by displaying an associated preview temporarily at operation 1140. On the other hand, upon detection of selection of an item on the navigation bar at operation 1150, the main view pane of the user interface may be changed to the module of the communication application associated with the selected item at operation 1160.

The operations included in process 1100 are for illustration purposes. Providing a dynamic navigation bar for an expanded communication service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device to provide a navigation bar within an expanded communication application, the method comprising:
    displaying the navigation bar within a user interface of the expanded communication application, wherein the navigation bar includes items that represent different modules of the expanded communication application, wherein the different modules comprise an email exchange application, a scheduling application, a contact management application, and a task management application;
    detecting a hover action on one of the items of the navigation bar;
    displaying, through a viewing pane, a temporary preview of content associated with a first module of the modules represented by the item;
    detecting of a selection action on the temporary preview;
    displaying the content associated with the first module in a main view of the user interface; and
    in response detecting a switch of the viewing pane from the first module to a second module displaying a preview of another content associated with the second module, automatically switching the main view to display the other content associated with the second module.

2. The method of claim 1, further comprising:
    modifying a size of the item in response to a change on an available display area.

3. The method of claim 1, further comprising:
    docking the temporary preview on to the main view in response to a user customization to dock the temporary preview.

4. The method of claim 1, further comprising:
    configuring the temporary preview based on one or more from a set of a layout of the user interface and a permission level associated with a user credential.

5. The method of claim 1, further comprising:
    customizing the content based on one or more from a set of default parameters of the expanded communication application, a learned user behavior from a user interacting with the expanded communication application, one or more parameters configurable by the user, and one or more parameters obtained from other applications associated with the user.

6. The method of claim 1, further comprising:
    displaying summary information of the modules with an information badge on the navigation bar.

7. The method of claim 1, further comprising:
    detecting the item to include one from a set of a new item, a user selected item, and a recently viewed item.

8. The method of claim 1, further comprising:
    detecting another selection action of the item; and
    displaying the modules represented by the item on the main view of the user interface.

9. A computing device to provide an expanded communication application with a navigation bar, the computing device comprising:
    an input device;
    a memory;
    a processor coupled to the memory and the input device, the processor executing the expanded communication application and causing a user interface associated with the expanded communication application to be displayed on a screen, wherein the processor is configured to:
        display the navigation bar within a user interface of the expanded communication application, wherein the navigation bar includes items that represent different modules of the expanded communication application, wherein the different modules comprise an email exchange application, a scheduling application, a contact management application, and a task management application;
        detect a hover action on one of the items of the navigation bar;
        display, through a viewing pane, a temporary preview of content associated with a first module of the modules represented by the item;
        detect of a selection action on the temporary preview;
        display the content associated with the first module in a main view of the user interface; and
        in response detecting a switch of the viewing pane from the first module to a second module displaying a preview of another content associated with the second module, automatically switch the main view to display the other content associated with the second module.

10. The computing device of claim 9, wherein the processor is further configured to:
    move the navigation bar based on one or more from a set of a type of the content displayed in the user interface, a layout of the content displayed in the user interface, an available display area in the user interface, a left or right handedness of a user, a user credential, and a location attribute that includes one or more from a set of a language selection for the user interface, a geographic location of the user, a time zone of the user, and a country of the user.

11. The computing device of claim 9, wherein the processor is further configured to:
    detect the temporary preview as docked on a location of the user interface; and
    display the temporary preview permanently at the location.

12. The computing device of claim 9, wherein the processor is further configured to:
    detect the temporary preview as pinned on a location of the user interface; and
    display the temporary preview permanently at the location.

13. The computing device of claim 9, wherein the processor is further configured to:
    dock the temporary preview in an animated fashion on the main view in response to a user customization to dock the temporary preview.

14. The computing device of claim 9, wherein the processor is further configured to:
    hide the temporary preview in an animated fashion on the main view in response to a user customization to hide the temporary preview.

15. The computing device of claim 9, wherein the processor is further configured to:
    detect a new module provided by one or more from: a service provider and a third party; and
    add a new item that represents the new module into the navigation bar.

16. A computer-readable memory device with instructions stored thereon to provide a dynamic navigation bar within an expanded communication application, the instructions comprising:
- displaying the navigation bar within a user interface of the expanded communication application, wherein the navigation bar includes items that represent different modules of the expanded communication application, wherein the different modules comprise an email exchange application, a scheduling application, a contact management application, and a task management application;
- detecting a hover action on one of the items of the navigation bar;
- displaying, through a viewing pane, a temporary preview of content associated with a first module of the modules represented by the item;
- detecting of a selection action on the temporary preview;
- displaying the content associated with the first module in a main view of the user interface; and
- in response detecting a switch of the viewing pane from the first module to a second module displaying a preview of another content associated with the second module, automatically switching the main view to display the other content associated with the second module.

17. The computer-readable memory device of claim 16, wherein the instructions further comprise:
- configuring the temporary preview based on one or more from a set of a layout of the user interface and a permission level associated with a user credential; and
- customizing the content based on one or more from a set of default parameters of the expanded communication application, a learned user behavior from a user interacting with the expanded communication application, one or more parameters configurable by the user, and one or more parameters obtained from other applications associated with the user.

18. The computer-readable memory device of claim 16, wherein the instructions further comprise:
- displaying summary information of the modules with an information badge on the navigation bar; and
- detecting the item to include one from a set of a new item, a user selected item, and a recently viewed item.

19. The computer-readable memory device of claim 16, wherein the instructions further comprise:
- detecting the temporary preview as one from a set of docked and pinned on a location of the user interface; and
- displaying the temporary preview permanently at the location.

* * * * *